(12) United States Patent
Labeau et al.

(10) Patent No.: US 9,102,764 B2
(45) Date of Patent: Aug. 11, 2015

(54) GUAR PROCESS MONITORING METHODS

(75) Inventors: Marie-Pierre Labeau, Sevres (FR);
Kraig Luczak, Cranbury, NJ (US);
Vincent Monin, Princeton, NJ (US);
Serge Henrot, Sainte-Catherine (FR);
Aziz Boukhelifa, Pennington, NJ (US);
Simon Firkins, Baltimore, MD (US)

(73) Assignee: RHODIA OPERATIONS, Paris (FR)

( * ) Notice: Subject to any disclaimer, the term of this patent is extended or adjusted under 35 U.S.C. 154(b) by 738 days.

(21) Appl. No.: 13/373,596

(22) Filed: Nov. 21, 2011

(65) Prior Publication Data

US 2012/0130065 A1    May 24, 2012

Related U.S. Application Data

(60) Provisional application No. 61/458,412, filed on Nov. 23, 2010.

(51) Int. Cl.
*C08B 37/00* (2006.01)
*C08B 11/12* (2006.01)
*C08B 15/00* (2006.01)

(52) U.S. Cl.
CPC ............ *C08B 37/0096* (2013.01); *C08B 11/12* (2013.01); *C08B 15/00* (2013.01); *C08B 37/006* (2013.01); *C08B 37/0033* (2013.01); *C08B 37/0093* (2013.01)

(58) Field of Classification Search
CPC .................................................... C08B 37/0096
USPC .......................................... 536/127, 124, 114
See application file for complete search history.

(56) References Cited

U.S. PATENT DOCUMENTS

| | | | |
|---|---|---|---|
| 4,138,313 A | 2/1979 | Hillstrom et al. | |
| 4,746,405 A | 5/1988 | Lisnyansky et al. | |
| 5,536,825 A | 7/1996 | Yeh et al. | |
| 6,653,150 B1 | 11/2003 | Reed | |
| 2004/0134630 A1 | 7/2004 | Lahtinen et al. | |
| 2010/0099862 A1 | 4/2010 | Sprehe et al. | |

*Primary Examiner* — Patrick Lewis
*Assistant Examiner* — Everett White (57) ABSTRACT

Disclosed are methods relating to monitoring the processing of polysaccharides and, in particular, monitoring the processing of guar in order to improve guar yield and/or lower impurity concentration in the wash effluent fluid.

8 Claims, 10 Drawing Sheets

GUAR PROCESS MONITORING METHODS

CROSS-REFERENCE TO RELATED APPLICATION

This application claims the benefit of U.S. Provisional Application Ser. No. 61/458,412, filed Nov. 23, 2010, herein incorporated by reference.

FIELD OF INVENTION

This invention relates to methods relating to monitoring the processing of polysaccharides and, in particular, monitoring the processing of guar, via analysis of the wash effluent fluid, to improve yield and/or lower impurity concentration and/or improve application performances.

BACKGROUND OF THE INVENTION

Polysaccharides, including derivatized polysaccharides such as cellulose derivatives, e.g., carboxymethyl cellulose and guar derivatives, e.g. carboxyl methyl guar, carboxylmethyl hydroxylpropyl guar, hydroxypropyl guar, and hydroxypropyl trimethylammonium guar and hydroxypropyl trimethylammonium hydroxypropyl guar, are commercially available materials used in a variety of applications, including as ingredients in personal care compositions.

Galactomannans are a class of polysaccharides composed of galactose and mannose. In general, the structure of the polymers consists of a linear chain of 1,4-linked beta D-mannopyranosyl units with single-membered alpha-D-galactopyranosyl units joined by 1,6 linkages. Galactomannans vary in the extent and uniformity of substitution with respect to their galactose moieties. For example, two sources of galactomannans are guar and locust bean gums. Galactomannan from guar has a galactose:mannose molar ratio of approximately 1:2. Galactomannan from locust bean gum has a galactose:mannose molar ratio of approximately 1:4.

There are three major components of a guar seed, i.e., the seed coat or hull, the endosperm, and the germ. The endosperm contains most of the galactomannan of the seed and consists mainly of galactomannan. In addition to the galactomannan, the endosperm of guar seeds contains proteins (5-7% wt) and small amounts of pectins, cellulose and hemicelluloses (each below 5%). During preparation of the galactomannan, some small amount of hull material containing cellulose may be processed with the galactomannan. In its natural state, the weight average molecular weight of guar galactomannan is typically in the millions.

SUMMARY OF INVENTION

Guars are available in several forms, including derivatized and underivatized. Guar grades also differ by their molecular weights (Mws), some grades having Mws close to native guar Mws while others are depolymerized on purpose. Among the derivatized forms available are cationic, nonionic, anionic, and zwitterionic and combinations of cationic, non-ionic, anionic, and zwitterionic. Among the derivatized guar splits and gums are carboxyl methyl guar gums, hydroxypropyl guar gums, carboxymethyl hydroxypropyl guar gums, hydroxypropyl trimethylammonium guar gums, and hydroxypropyl trimethylammonium hydroxypropyl guar gums which are used in a variety of applications and are typically made by a "water-splits" process, wherein material, known as guar "splits", derived from guar seeds undergoes reaction with a derivatizing agent in an aqueous medium.

In one aspect, the present invention is a method for controlling the loss of one or more polysaccharides and/or the efficiency of the washing step (removal of impurities) during a washing process comprising: a) obtaining wash effluent during at least one wash step; b) analyzing one or more characteristics of the wash effluent; and c) adjusting washing parameters for the washing process based upon the analysis of step (b). In one embodiment, the polysaccharide is derivatized or underivatized guar.

In another aspect, the present invention is a method for controlling the loss of one or more polysaccharides (or increasing the reaction efficiency), which in one embodiment is guar, during a washing process comprising: a) obtaining wash effluent during at least one wash step; b) analyzing one or more characteristics of the wash effluent; and c) adjusting the reaction parameters, the washing parameters or a combination of both for the process based upon the analysis of step (b). For example, if very high levels of residuals are measured, the reaction parameters including but not limited to temperature, stirring speed, longer soaking time, longer reaction time, type of reagent or reagent concentration, contact time, pressure, catalyst reaction time, reagent contact time, or any combination thereof, could be modified to increase grafting efficiency. As another example, if a lot of fines are measured, then the stirring speed and reactor charge (volume of reagents in the reactor) could be modified to decrease attrition.

DETAILED DESCRIPTION OF THE INVENTION

Generally speaking, the following terminology is used to describe guar derivatives:

Degree of substitution (DS): This terminology is used to report guar modification with reagents which can not polymerize (sodium monochloroacetate for example) or which do not polymerize under the reaction conditions (for example unsaturated monomers such as sodium vinyl sulfonated do not polymerize in the absence of free radicals). Since each sugar ring contains on average 3 hydroxy functions, the DS varies between 0 and 3. DS=1 means that, on average, 1 reagent has been grafted per anhydro sugar ring while 2 out of the 3 initial hydroxyl groups are still intact.

The DS is measured using various methods, depending on grafts nature and extent of grafting. For example NMR is used to measure the DS of carboxymethyl guars (CMGs) when high DS is expected (above 0.5) while titration is used for DS below 0.5.

Molar substitution (MS): This terminology is used to describe the guar modification with reagents such as PO, EO (propylene oxide, ethylene oxide), which, in theory, might form oligomers under the reaction conditions. Consequently MS is theoretically not limited to 3.

The MS is usually measured by NMR or other techniques depending on grafts nature and extent of grafting.

Average molecular weights (Mw): Gel Permeation Chromatography (GPC, or Size Exclusion Chromatography, SEC) are sometimes used, providing relative molecular weights. Currently, absolute Molecular weights are routinely measured in R&D facilities by MALLS (Multi Angle Laser Light Scattering) coupled with a GPC column. Viscosity measurements are still performed as part of quality control.

Guar Derivatizing Process:

In guar gum, the basic unit of the polymer consists of two mannose units with a glycosidic linkage and a galactose unit attached to a hydroxyl group of one of the mannose units. On the average, each of the anhydro sugar units contains three available hydroxyl sites. A degree of substitution of three would mean that all of the available hydroxy sites have been substituted with a reagent.

Generally, a polysaccharide such as guar is reacted with one or more derivatizing agents under appropriate reaction conditions to produce a polysaccharide having one or more desired substituent groups. In one embodiment, suitable derivatizing agents are commercially available and typically contain a reactive functional group, such as an epoxy group, a chlorohydrin group, or an ethylenically unsaturated group, and at least one substituent group, such as a cationic, nonionic, anionic or zwitterionic substituent group. In another embodiment, suitable derivatizing agents can be a precursor of a substituent group, where the substituent group is linked to a reactive functional group by bivalent linking group, such as an alkylene or oxyalkylene group.

In some embodiments the polysaccharides are reacted with a derivatizing agent in the optionally presence of base, typically in an aqueous medium under relatively mild conditions. In one embodiment, the mixture is heated to a temperature of between about 30° C. to 80° C., between 40° C. to 70° C., between 40° C. to 60° C., between 50° C. to 70° C., or between 50° C. and 60° C., to produce derivatized polysaccharide or splits, that is, derivatized polysaccharide splits having one or more functional groups.

Suitable cationic substituent groups include but are not limited to primary, secondary, or tertiary amino groups or quaternary ammonium, sulfonium, or phosphinium groups. Suitable nonionic substituent groups include but are not limited to hydroxyalkyl groups, such as hydroxypropyl groups.

Suitable anionic groups include but are not limited to carboxylates, including carboxyalkyl groups, and sulfonates. Suitable zwitterionic groups include, but are not limited to, ammonium alkylsulfonates such as dimethylammonium propylsulfonates. The cationic, nonionic, anionic substituent and/or zwitterionic groups may be introduced to the guar polysaccharide chains via a series of reactions or by simultaneous reactions with the respective appropriate derivatizing agents. In one embodiment, the polysaccharide is reacted with an alkylene oxide derivatizing agent, such as ethylene oxide, propylene oxide, or butylene oxide, under known alkoxylation conditions to add hydroxyalkyl and/or poly (alkyleneoxy) substituent groups to the polysaccharide chains. In one embodiment, the polysaccharide is reacted with a carboxylic acid derivatizing agent, such as sodium monochloroacetate, under known etherification conditions to add carboxyalkyl groups to the guar polysaccharide chains.

In one exemplary embodiment, the derivatizing agent comprises a cationic substituent group that comprises a cationic nitrogen radical, for example, a quaternary ammonium radical. Typical quaternary ammonium radicals include trialkylammonium radicals, such as trimethylammonium radicals, triethylammonium radicals, tributylammonium radicals, aryldialkylammonium radicals, such as benzyldimethylammonium radicals, radicals, and ammonium radicals in which the nitrogen atom is a member of a ring structure, such as pyridinium radicals and imidazoline radicals, each in combination with a counterion, typically a chloride, bromide, or iodide counterion. In some embodiments, the cationic substituent group is linked to the reactive functional group of the cationizing agent, for example, by an alkylene or oxyalkylene linking group.

Suitable cationizing reagents include epoxy-functional cationic nitrogen compounds, such as, for example, 2,3-epoxypropyltrimethylammonium chloride; chlorohydrin-functional cationic nitrogen compounds, such as, for example, 3-chloro-2-hydroxypropyl trimethylammonium chloride, 3-chloro-2-hydroxypropyl-lauryldimethylammonium chloride, 3-chloro-2-hydroxypropyl-stearyldimethylammonium chloride; and vinyl-, or (meth)acrylamide-functional nitrogen compounds, such as methacrylamidopropyl trimethylammonium chloride, or (meth)acrylate-functional nitrogen compounds, such as methacrylamidopropyl trimethylammonium chloride.

In some embodiments the guar or guar splits are reacted with a chlorohydrin-functional quaternary ammonium compound in the presence of base, typically in an aqueous medium under relatively mild conditions, such as heating to a temperature mixture is heated to a temperature of between about 30° C. to 80° C., between 40° C. to 70° C., between 40° C. to 60° C., between 50° C. to 70° C., or between 50° C. and 60° C., to produce cationic guar or guar splits, that is, derivatized guar splits having cationic functional groups.

In one embodiment, and similar to the synthesis of other cationic guars, the synthesis of guar hydroxypropyltrimonium chloride (more specifically, guar 2-hydroxy-3-(trimethylammonium)propyl ether chloride), requires the reaction of 2,3-epoxypropyl trimethylammonium chloride or (3-chloro-2-hydroxypropyl) trimethylammonium chloride on the hydroxyl groups of guar, generally in the presence of basic catalysts. Base catalysts include, for example, sodium hydroxide, also generally known as caustic soda.

In one embodiment, the preparation of polysaccharide derivatives, which in one embodiment is a cationic guar, includes reacting the polysaccharide or guar in a semi-dry, dry or powder form with a cationizing reagent in a mixture of water and water miscible solvent e.g., alcohol medium, where the mixture contains a catalyst such as a base or an initiator. In another embodiment, the polysaccharide or guar in a semi-dry, dry or powder form is reacted (with or without a cationizing reagent or a derivatizing agent) in a water miscible or immiscible solvent e.g., alcohol medium. This is followed by treatment or purification with or without an alkaline base or initiator. The alcohol medium is aqueous alcohol slurry which provides sufficient water to provide at least slight swelling of the guar (i.e., polygalactomannan or guar gum) while at the same time maintain the integrity of the suspended guar particles. An amount of water of up to 10%, 20%, 30%, 50% or 60% by weight based on the total weight of the aqueous solvent system may be used in carrying out this process.

The alcohol medium or solvents that are used are, in one embodiment, alcohols including but not limited to monohydric alcohols of 2 to 4 carbon atoms such as ethanol, isopropyl alcohol, n-propanol and tertiary butanol. In one embodiment the alcohol is isopropyl alcohol. The alkaline base that is used in this process is alkali metal hydroxide or ammonium hydroxide, typically, sodium hydroxide. The amount of alkaline base used can vary from about 10 to about 100% and, typically, from about 20 to 50% by weight, based on the weight of polysaccharide, guar or guar derivative utilized.

The amount of cationic reagent used in the process of this invention will be a sufficient amount to provide the amount or degree of substitution (DS) desired. More particularly, from about 5 to 400% by weight of the cationic reagent and preferably from about 10 to 300% based on the weight of polysaccharide, guar, polygalactomannan or guar derivative will be used in this process.

The process for introducing quaternary ammonium ether groups into guar can be conducted, in one embodiment, at a temperature in the range of between about 10° C. and 100° C., or in another embodiment in the range of between 10° C. and 90° C., or in another embodiment in the range of between about 20° C. and 60° C., or in another embodiment in the range of between about 30° C. and 50° C. The reaction time can vary in the range of from about 1 to 6 hours, from between about 1 to 5 hours or between about 2 and 4 hours. The process can be conducted in either open or closed vessels equipped with stirrers in batch or continuous operation.

In some embodiments, a cross-linking agent is used to partially and temporarily crosslink the guar chains during processing, thereby reducing the amount of water absorbed by the guar during the one or more washing steps. Borax (sodium tetra borate) is used in one embodiment, where the crosslinking process takes place under alkaline conditions and is reversible allowing the product to hydrate under acidic conditions. Maintaining the moisture content of the derivatized splits at a relatively low level, typically a moisture content of less than or equal to about 90 percent by weight, simplifies handling and milling of the washed derivatized splits. In the absence of crosslinking, the moisture content of washed derivatized splits is relatively high and handling and further processing of the high moisture content splits is difficult. Prior to end-use application, for example, as a thickener in an aqueous personal care composition such as a shampoo, the crosslinked guar is typically dispersed in water and the boron crosslinking then reversed by adjusting the pH of the guar dispersion, to allow dissolution of the guar to form a viscous aqueous solution.

In some embodiments, the crosslinking agents include but are not limited to copper compounds, magnesium compounds, glyoxal, titanium compounds, calcium compounds, aluminum compounds, p-benzoquinone, dicarboxylic acids and their salts, compounds and phosphate compounds.

Washing Step

After the reaction, the obtained product is separated by sedimentation, such as but not limited to centrifugation, or filtration (for both split and powder processes). Prior to such separation, however, intermediate steps can be taken to purify the product, such as washing. One or more washing steps can be utilized. In one embodiment, purifying the product in a washing process comprises a first washing step with a water-solvent mixture (for example, the water-solvent mixture used in the synthesis) and a second washing step with a diluted or undiluted water-solvent mixture (e.g., solvent process). In another embodiment, the intermediate steps include one or more aqueous solution washes, including but not limited to a first water wash, and a second water wash. Optionally, a third water wash can be utilized. The water may be purified water, deionized water, tap water or non-processed water (e.g., split process). The one or more washing steps can also be part of an iterative process, which for example can be repeating at least once the combined steps of washing then centrifugation/filtration.

The one or more wash steps are conducted in any suitable process vessel. Each wash step may be conducted as a batch process, such as for example, in a stirred mixing vessel, or as a continuous process, such as for example, in a wash column wherein a stream of the derivatized guar splits is contacted with a co-current or counter-current stream of aqueous wash medium.

In one embodiment, the product can be washed with an aqueous medium by contacting the derivatized guar with the aqueous medium and then physically separating the aqueous wash medium, which is in the form of wash effluent or waste water, from the derivatized guar. The wash effluent can contain residual reactants, traces of the final product, and/or impurities such as by products and un-reacted reagents. For example, after the reaction process the swollen splits are dewatered in a filtration system, which is shaken to remove the wash effluent from the solids (solid-liquid separation). The filtration system, in one embodiment, utilizes mesh screening to remove all the waste water along with particles smaller than the screen mesh opening. Removal of the liquids from solid guar particles can be through, for example, centrifugal force, gravity or pressure gradient. Examples include sieve filtering, high flow rate centrifugal screening, centrifugal sifters, decanting centrifuges, and the like. In one embodiment, the mesh screen from about 100 mesh (150 microns) to about 500 mesh (25 microns). In other embodiments, the mesh screen can be up to 700 mesh or greater.

In some embodiments, the derivatized guar is then washed in a washing column (e.g., a hydraulic wash column) where additional water or an aqueous solution is introduced along with the derivatized guar. This is performed to further clean or purify the processed guar. Typically, the guar-water mixture after washing in the wash column is again dewatered in a filtration system. In some embodiments, the step of washing the processed guar in the wash column followed by the step of dewatering in a filtration system is considered to be one "wash step".

In one exemplary embodiment, initial waste water is obtained from filtering immediately after the reaction process, more waste water is obtained after one or more washing steps and, finally, final waste water is obtained after final centrifugation prior to a drying/milling process. Typically, after a first wash, the waste water can contain mostly impurities such as salts and by-products; after a second wash (and subsequent washes), the waste water contains less impurities and more dissolved or solubilized guar.

One or more additional steps may be included before, between or concurrent with the one or more washing steps. For example, the product mixture from the process can be neutralized with an acid, such as for example acetic acid or other organic acid, before the procedure of solvent washes.

It is desirable to minimize the impurities in the final product, while at the same time maximizing the derivatized guar yield. Generally, the more wash water is utilized the more guar is lost to in the water, which lowers the derivatized guar yield. However, if not enough wash water is utilized, the impurities in the final product are at an unacceptable level, according to industry or regulatory standards. Such impurities, if not removed, may become part of the final product (for example, cosmetic, dental, hair care, thickeners) where such guar derivative is used as a raw material. In addition some derivatized guar produced is lost by attrition during the process. It is believed that current methods of washing guar during the process of cationizing guar, for example, realize a loss of between 20% to 40% of total guar, where this loss of guar occurs during the washing step(s). This can occur during guar splits filtration process [filtration] after the washing process, as described above. A minimum filter pore for filtration must be utilized (i.e., the mesh cannot be below a certain pore) in order to prevent fouling of the filtration system.

Measuring Guar in Waste water

Wash water utilized in processing guar (or polysaccharide or polysaccharide derivative) is mainly composed of dissolved guar, unreacted reagents, reagents by-products, guar fines, impurities or a combination of any of the above. The present invention is capable of measuring and/or analyzing in the waste water for (i) the guar loss during processing, (ii) the impurities or by-products created during processing, or (iii) a combination of both.

Figure 1:
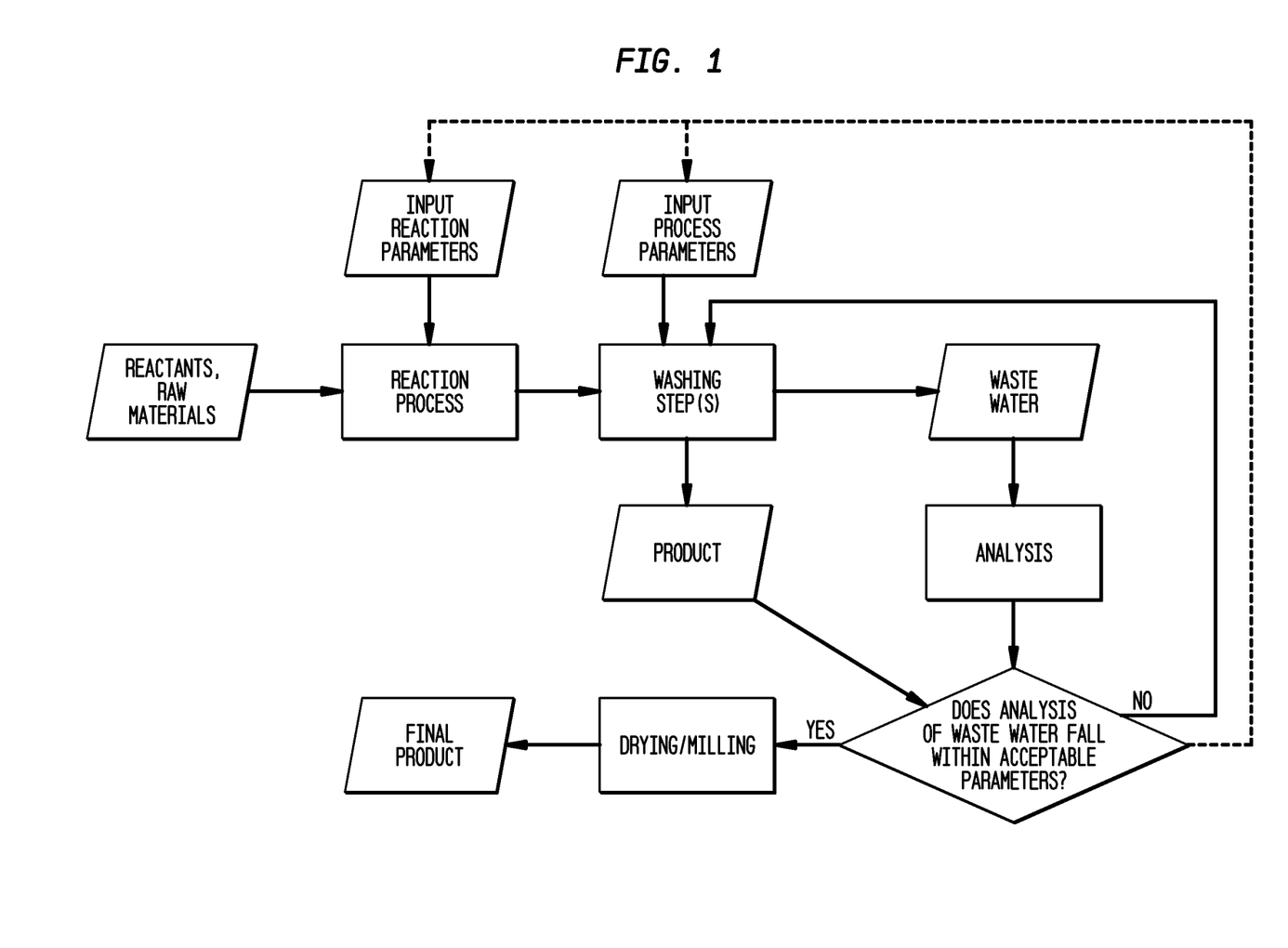
FIG. 1 is a flow diagram according to one aspect of the invention.
Figure 2:
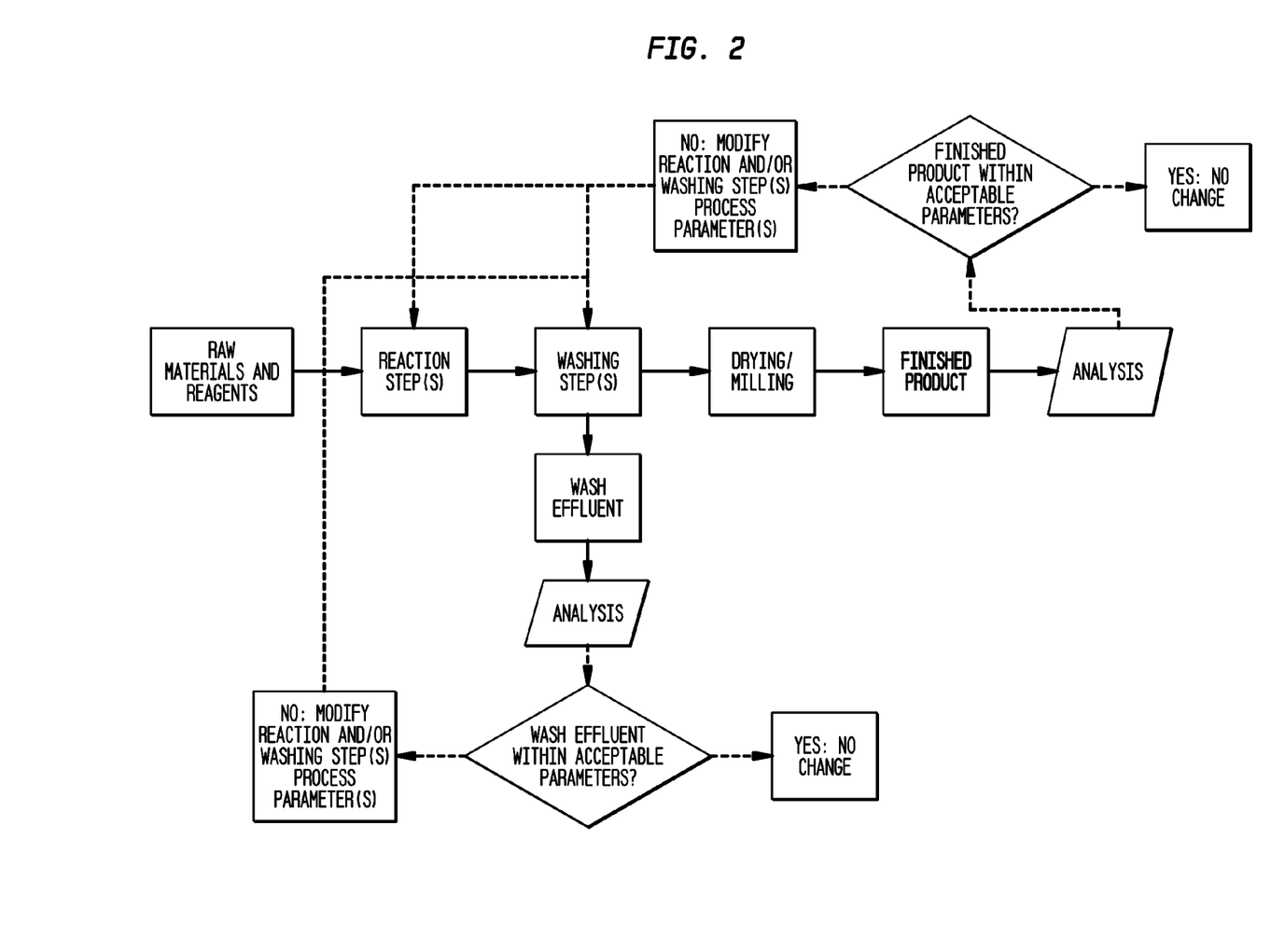
FIG. 2 is a flow diagram according to another aspect of the invention.

As seen in FIGS. 1 and 2, the washing process can be modified by analyzing the waste water to measure impurities (such as by-products and salts) solubilised guar, and guar fines. The analysis can be utilized to optimize washing efficiency. In some embodiments, the washing process is analyzed and modified on a continual basis during processing to optimize the process while minimizing down-time. In some embodiments, optimizing the process can include minimizing the impurities to an acceptable level while at the same time minimizing the amount of water utilized, thus maximizing the guar or derivatized polysaccharide (e.g., guar) yield. In some embodiments, the analysis and washing process parameters can be controlled online or via networked server, and performed in real time. For example, by measuring the real time concentration of solubilised guar, impurities, by-products, salts, any combination thereof, or a ratio of any or all of the foregoing (e.g., solubilised guar: impurities), an operator can input different parameters such as lowering or increasing wash ratio, wash flow rate, longer or short wash time, wash temperature, wash water pH, and the like, or any combination thereof.

It is believed that during the guar washing process, a loss between 20% and 40% of guar in water is observed (depending upon the guar grade and its solubility in water). During the washing step the ratio of (i) water utilized (by weight) to (ii) weight of guar (otherwise known as "wash ratio") is in the range of from about 1 to about 30 per washing step. In other embodiments, the wash ratio is in the range of from about 5 to about 20. In other embodiments, the wash ratio is an integer in the range of from about 10 to about 20. For example, to produce about 5 tons of guar, from about 5 tons of water (if the wash ratio is 1) to 100 tons of water (if the wash ratio is 20) can be utilized per wash step. It is believed that by analyzing the waste water corrective action can be taken with respect to the one or more wash step, reaction parameters, reactants/raw material inputs, or a combination thereof, in order to reduce guar loss to less than 25%, 15%, or 10%. Further, at the same time, the quality of the final product must not be compromised.

The wash water can be analyzed with any suitable technique including but not limited to fluorescent, luminescent, phosphorescent, light scattering colloidal particles, NMR (nuclear magnetic resonance), EPR (electro paramagnetic resonance), GPC (Gel Permeation Chromatography) method, used to establish a molecular weight distribution of lost guar), ESR (electron spin resonance), IR (infrared), FTIR (Fourier transform infra red), Near-IR, HPLC (method used to measure the concentration of impurities coming from side reactions, e.g., glycolate, diglycolate, chloroacetate), UV spectroscopy, Raman spectroscopy, Particle Size Distribution, Total Organic Carbon, Drying or evaporation to determine Total Solids Content, Filtration or centrifugation to determine Total Suspended Solids, Viscosity, Titrimetry to determine alkalinity or concentration of other compounds, Kjeldhal analysis or other technique to determine Nitrogen content, or other magnetic, vibrational, electromagnetic, or optical labeling or detection techniques.

Figure 3:
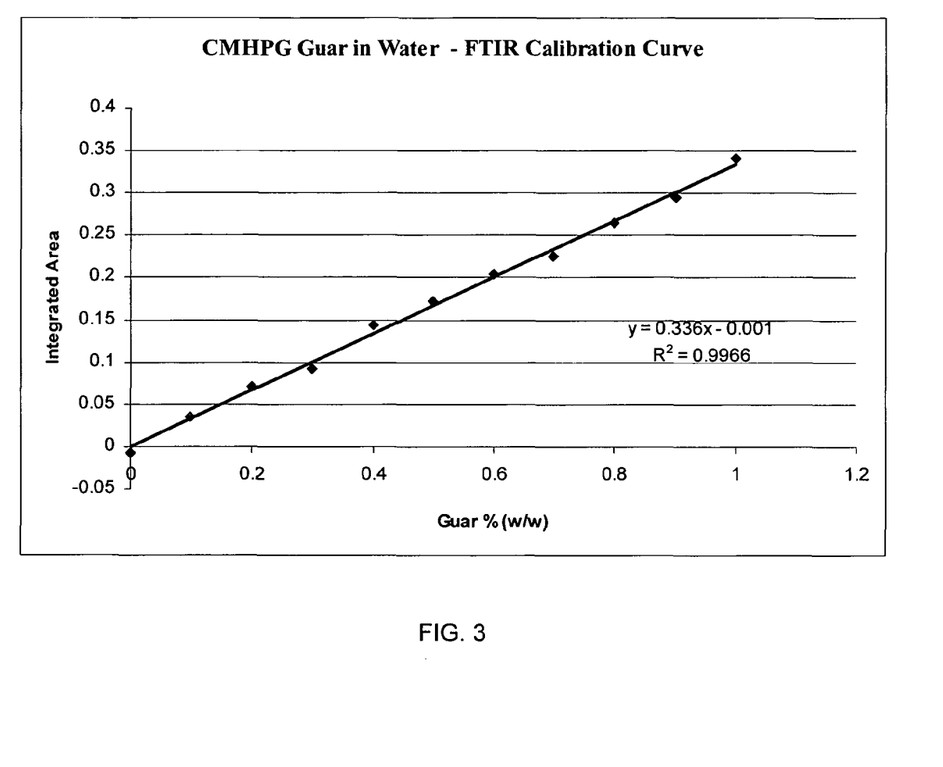
FIG. 3 is a chart of a FTIR calibration curve utilized in the present invention.

FTIR in combination with other analytical methods can be used to quantitatively measure trends in guar or derivatized guar loss in wash water or wash effluent. In one embodiment, a calibration curve is prepared from standards of known concentrations of finished product powder dissolved in water. The calibration curve using 3 measurements per standard for CMHPG Guar is shown in FIG. 3. The response is linear over the 0-1% w/w range, with a correlation coefficient >0.99%, as shown in FIG. 3. Using this calibration curve the % guar in actual wash water samples can be determined.

The apparatus that can be used to measure FTIR is commercially available, for example, Bruker Tensor 27 FTIR Spectrometer, Diamond ATR accessory, and corresponding software (Quant software). (Resolution: 4 cm-1, Type ATR spectrum, No Scans: 32, Range: 4200 cm-1 to 400 cm-1.)

Without being bound by theory, it is believed that a first part of guar loss is attributable to solubilized guar. As shown in table 1, GPC shows that the part of this guar is low molecular weight as shown in table 1. Results of table 1 were obtained after the following procedure: 300 g of splits are activated and then washed with a ratio water/splits of 10 during 15 min. IR shows a loss of 10%, it means 30 g of guar solubilized in the water. This wash water was analyzed by GPC in order to determine the molecular weight distribution of guar:

TABLE 1

Gel Permeation Chromatography (GPC) Characterization

| Mw | Concentration in washing water, g/L | Nature | Quantity in washing water, g | % of global guar loss |
|---|---|---|---|---|
| 400 | ~6 | Guar + salt + NaOH | 18 | (60%) |
| 1000 | 1 | guar | 3 | ~10% |
| 140 000 | 0.04 | guar | 0.12 | 0.4% |
| >2 000 000 | 0.2 | guar | 0.6 | 2% |
| Total | | | 21.72 | 72.4% |
| GAP | | | 8.28 | 27.6% |

GPC measurement shows that roughly 70% of observed guar losses have a weight average molecular weight (Mw) of less than 1000. This range of molecular weight characterizes monomers or very low polymer chains. Galactomannan from TPS splits generally have a Mw ranging from about 1,000,000 to 2,500,000. The method was refined to better dissociate guar from salt and NaOH in the range of Mw<400), and table 2 shows results obtained only for guar. During this second campaign of analysis, the guar loss in the waste water (i.e., washing liquor) detected by IR was about 12% by weight (w/w).

TABLE 2

Confirmation of Gel Permeation Chromatography (GPC) Characterization

| Mw | Concentration g/L | Nature | guar loss % |
|---|---|---|---|
| Washing liquor | | | |
| <2000 | 7.6 | Guar | 7.9 |
| >700000 | 0.25 | Guar | 0.3 |

GPC measurement shows again that 8% of the losses measured by IR (12%) are guar with low Mw (less then 2000). This range of molecular weight characterizes monomer or low polymer chain.

Total guar loss estimated to 34% w/w for derivatized guar is believed to be divided into two parts: (i) derivatized guar solubilised in wash water, estimated to between 10%-15%, (ii) guar fines, i.e., insoluble guar particles, none solubilised in washing water but lost by physical entrainment during S/L separation after washing. This part of loose guar is estimated to 10%-30%.

The following experiments demonstrate the ability to analyze with reasonable precision trends in guar loss (fines or solubilised chains), as well as impurities loss (salts and other by-products) in the wash effluent or waste water. Use of one of the analytical methods, a combination of two or more of the analytical methods, or a ratio of specific results using one or more of the analytical methods can be employed using the present invention. Such analysis can be utilized in-line or at-line to adjust the wash and/or reaction parameters of the process. In one embodiment, the analysis is conducted as a bench scale analysis or lab-based analysis. Such adjustment to reaction or wash parameters can be performed via a general or local network that controls one or more of such parameters. Such adjustment can also be performed manually.

Adjusting the wash and/or reaction parameters of guar processing is desirable to increase the product yield, decrease the guar loss in the wash effluent or waste water, adjust the relative amounts of guar fines to longer guar chains in the wash effluent, increase the impurity content in the wash effluent, maximize or adjust the ratio of impurity to guar loss in the wash effluent, adjust the ratio of impurity to either one of the guar fines or solubilised guar in the wash effluent, or a combination of any of the above. In one embodiment, an operator can utilize the analytical methods described herein to maximize or adjust the ratio of impurity to guar loss in the wash effluent such that the final product purity is maximized relative to guar loss through washing.

Carboxylmethyl hydroxylpropyl (CMHPG) guar was utilized for the following lab experiments.

EXPERIMENT 1

Yield: Solids Recovered vs. Splits+PO+SMCA

Figure 4:
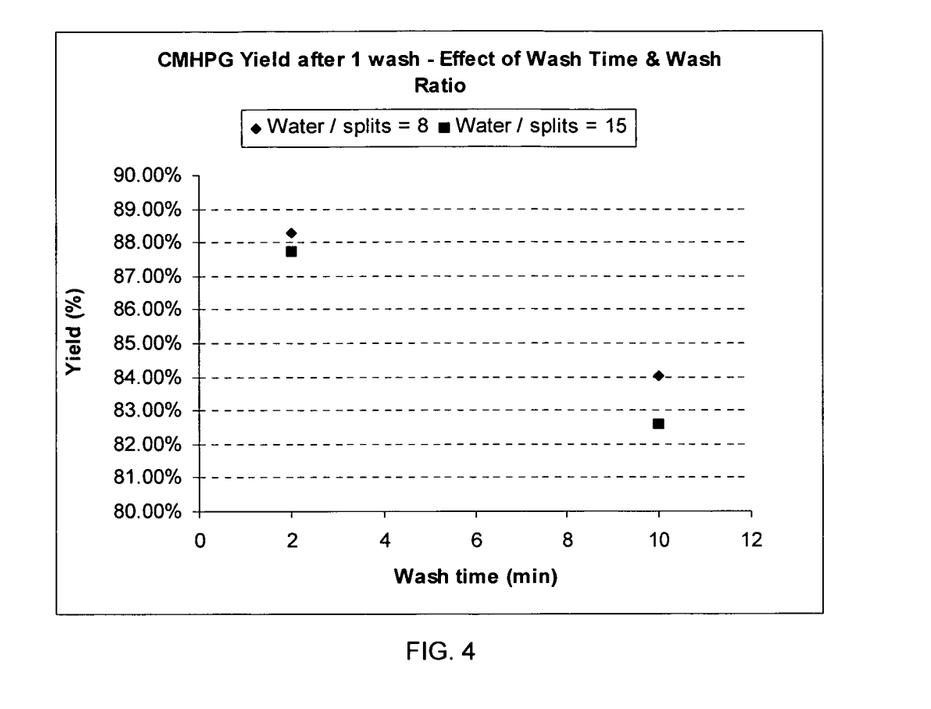
FIG. 4 is a chart of the derivatized guar yield after 1 wash.

Referring to FIG. 4, the effect of both wash time and wash ratio after one wash on CMHPG was analyzed. It was observed that the higher the water ratio, the lower the yield of product. It was also observed that a higher wash time was inversely proportional to the yield.

Figure 5:
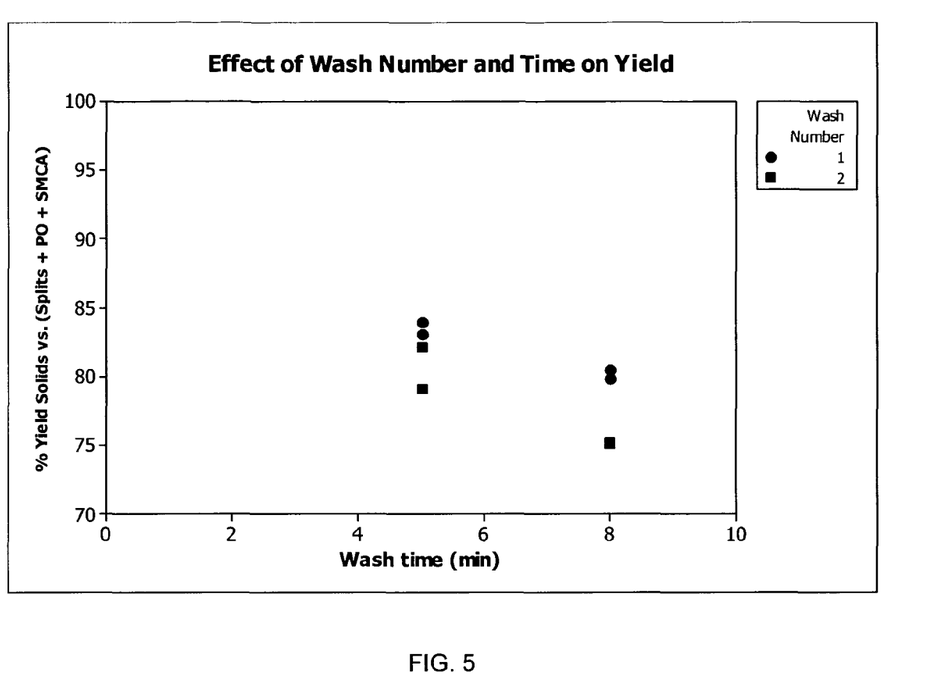
FIG. 5 is a chart illustrating the effect of wash number and time on yield.
Figure 6:
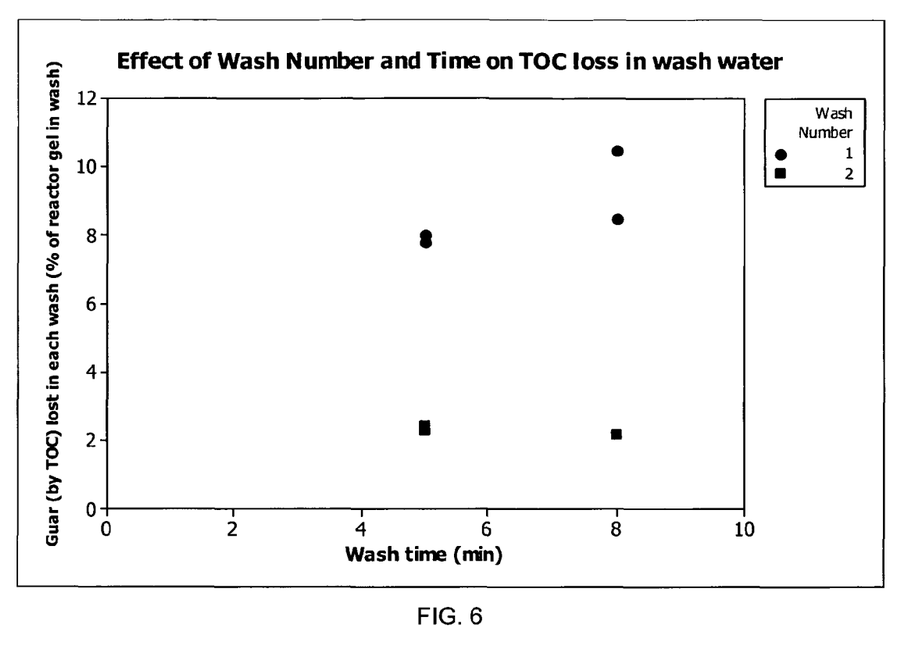
FIG. 6 is a chart illustrating the effect of wash number and time on total organic content (TOC) in wash water.

The following experiments were conducted as follows:
"Good Wash"=2 wash, 5 minutes each, Ratio Water/Splits=15
"Poor Wash"=2 wash, 8 minutes each, Ratio Water/Splits=15
Guar loss by 4 different analyses of wash water: TOC, FTIR, UV, GPC-RI Referring to FIGS. 5 and 6, the figures show the TOC analysis of the effect of the (i) number of washes and (ii) wash time on TOC yield in the wash water. Conversion factor: TOC in guar=45.4%. Determining the conversion factor is as follows:

Calculation of Carbon Content of Various Compounds
Guar Monomer Anhydrodextrose:

$C_6H_{10}O_5$=162 g/mol
Carbon content C=6*12/162=44.4% w/w (weight percent by total weight)
Carboxymethyl Group
—CH2-COONa
$C_2H_2O_2Na$: 81 g/mol
C=2*12/81=29.6% w/w
Hydroxypropyl Group
—CH2-CHOH—CH3
$C_3H_7O$: 59 g/mol
C=3*12/59=61% w/w
CMHPG (DS=0.11, MS=0.33)
162+0.11×81+0.33×59=190.4 g/mol
Carbon Content
C=(162×44.4%+0.11×81×29.6%+0.33×59×61%)/190.4=45.4% w/w
By-Products
Sodium Glycolate
CH2OH—COONa: 98 g/mol
$C_2H_3O_3Na$
C=2*12/98=24.5% w/w
Propylene Glycol
CH2OH—CHOH—CH3: 76 g/mol
$C_3H_8O_2$
C=3*12/76=47.4% w/w As observed, the TOC analyses showed an increasing organic content in the wash water as the wash time is increased with respect to the first wash. As it is believed a majority of the organic content is removed during the first wash step, the second was step showed inconclusive results.

Figure 7:
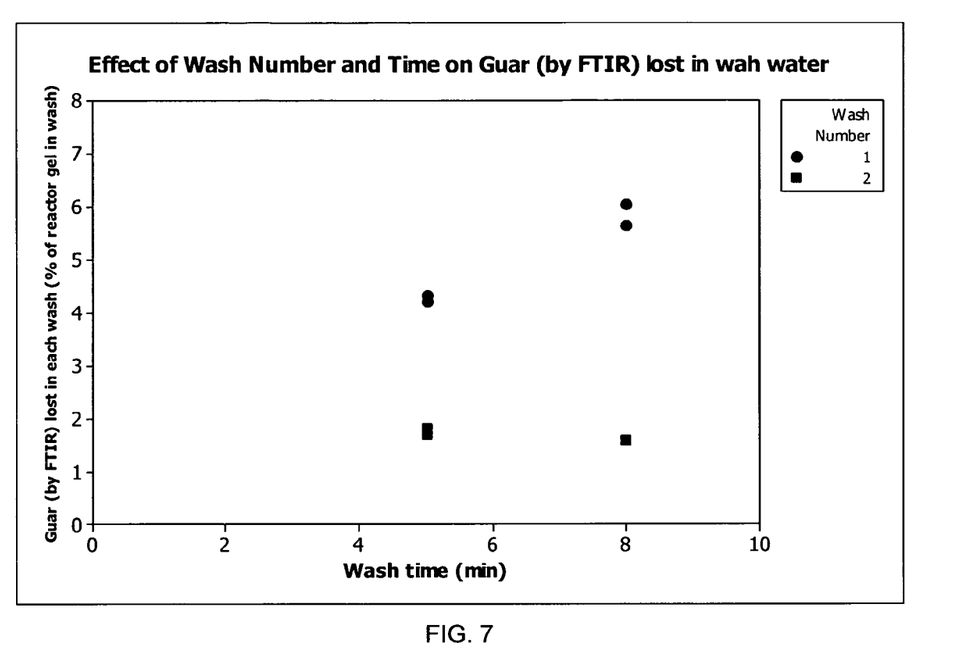
FIG. 7 is a chart illustrating the effect of wash number and time on guar loss (via FTIR) in wash water.

Referring to FIG. 7 shows the FTIR analysis of the effect of the (i) number of washes and (ii) wash time on yield (guar+impurities+other organic content) in the wash water. It is believed that varying the conversion factor and comparing the TOC analysis (under the conversion factor) with the FTIR analysis allows for the determination of relative amounts of guar versus impurities or organic by-products.

As observed, the FTIR analyses showed an increasing content in the wash water as the wash time is increased with respect to the first wash. As it is believed a majority of the guar+impurities+other organic content is removed during the first wash step, the second was step showed inconclusive results.

Figure 8:
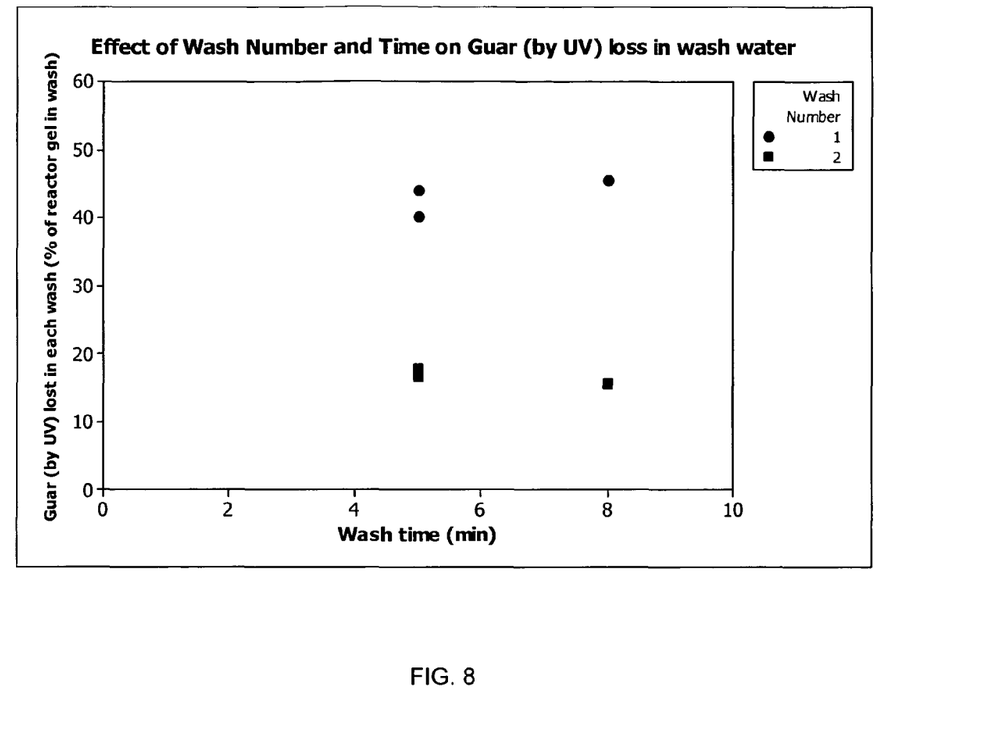
FIG. 8 is a chart illustrating the effect of wash number and time on guar loss (via UV) in wash water.

Referring to FIG. 8, the chart illustrates the guar loss in the wash water by UV analysis. Without being bound by theory, it is believed that total guar loss by UV is overestimated, compared to solids balance. This confirms another compound contributes to the high UV signal.

Figure 9:
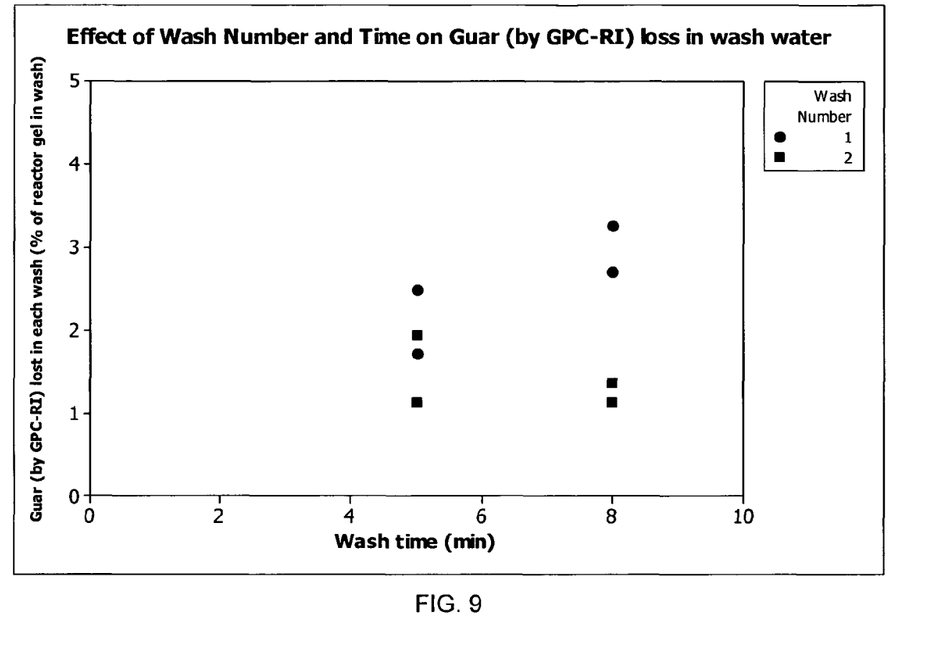
FIG. 9 is a chart illustrating the effect of wash number and time on guar loss (by GPC-RI) in wash water.

Now referring to FIG. 9, the chart illustrates guar loss in water by GPC-RI.

Utilizing the measurements of residual guar in waste water using FTIR and UV/Vis spectroscopy, FIGS. 7 and 8, respectively, an experiment was conducted to measure residual guar (as well as impurities and other organic content) by separating the guar from low molecular weight components present in the waste water using size-exclusion chromatography, and estimating the concentration using differential refractive index detection. Multi-angle light scattering (MALS) was also monitored to ensure that only the high molecular weight content was measured (which excludes low molecular weight impurities).

Figure 10:
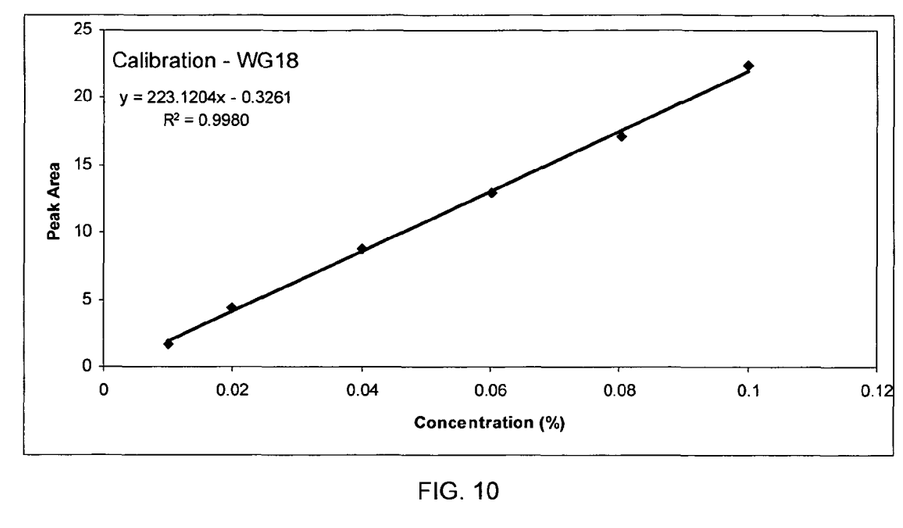
FIG. 10 is a chart illustrating a calibration curve utilized in calibrating the present invention.

Results were obtained using the following set-up:
Conditions:
Column: Waters Ultrahydrogel 120, 3 in series
Mobile Phase: 100 mM $NaNO_3$, 0.02% $NaN_3$
Flow Rate: 1.0 ml/min Detectors: Wyatt HELEOS Multi-Angle Light Scattering Detector, Wyatt rEX Refractive Index Detector
Inj. Volume: 50 μl
Temperature: ambient
Run time: 50 minutes Standards of WG18 were supplied at 0.1%, 0.05% and 0.01% by weight in water. The calculated concentrations did not take into account moisture content or insoluble material in the guar powder. Additional standards were prepared from the 0.1% standard. The standards were injected twice each and the peak areas were plotted versus concentration as shown below. The calibration curve can be seen in FIG. 10. The 0.05% standard was omitted from the fit.

TABLE 3

| Conc wt % | area 1 | area 2 | Area avg |
|---|---|---|---|
| 0.0100 | 1.7786 | 1.6327 | 1.706 |
| 0.0200 | 4.1506 | 4.7150 | 4.433 |
| 0.0401 | 8.8217 | 8.8157 | 8.819 |
| 0.0500 | 9.3592 | 10.106 | 9.733 |
| 0.0603 | 13.223 | 12.639 | 12.93 |
| 0.0803 | 16.913 | 17.270 | 17.09 |
| 0.1000 | 22.135 | 22.647 | 22.39 |

The wash water samples were diluted in water by a factor of 5, filtered through 0.45m filters and injected under the same conditions. The concentration of the wash water samples is given below (two measurements for each sample).

TABLE 4

| Sample | Wash | Wt sample | Total Wt | dilution | Area 1 | Area 2 | Amt 1 | Amt 2 | Avg % |
|---|---|---|---|---|---|---|---|---|---|
| R0931-042-15 | 1st | 2.0014 | 10.2553 | 5.1241 | 9.7691 | 9.7828 | 0.232 | 0.232 | 0.232 |
|  | 2nd | 2.0224 | 10.3402 | 5.1128 | 3.7031 | 4.1292 | 0.092 | 0.102 | 0.097 |
| R0931-042-16 | 1st | 1.9832 | 10.1898 | 5.1381 | 6.7975 | 6.2483 | 0.164 | 0.151 | 0.158 |
|  | 2nd | 2.0220 | 10.0087 | 4.9499 | 7.0804 | 7.3352 | 0.164 | 0.170 | 0.167 |
| R0931-042-17 | 1st | 2.0134 | 10.0163 | 4.9748 | 11.1890 | 10.9260 | 0.257 | 0.251 | 0.254 |
|  | 2nd | 2.0153 | 10.0706 | 4.9971 | 5.1800 | 4.9409 | 0.123 | 0.118 | 0.121 |
| R0931-042-18 | 1st | 2.1346 | 10.4560 | 4.8983 | 13.4880 | 13.2300 | 0.303 | 0.298 | 0.300 |
|  | 2nd | 2.0460 | 10.5116 | 5.1376 | 4.0461 | 3.9322 | 0.101 | 0.098 | 0.099 |

Because the refractive index detector has been calibrated, one should be able to calculate the actual concentration of the samples based on the area of the refractive index peaks and an estimate for the specific refractive index increment dn/dc (~0.14 for native guar). For the calibration standards are as follows:

TABLE 5

| Conc % | area 1 | area 2 | Area avg | actual conc 1 | actual conc 2 | actual conc avg | % recovery |
|---|---|---|---|---|---|---|---|
| 0.0100 | 1.7786 | 1.6327 | 1.706 | 0.003557 | 0.003265 | 0.003411 | 34.1 |
| 0.0200 | 4.1506 | 4.7150 | 4.433 | 0.008301 | 0.009430 | 0.008866 | 44.4 |
| 0.0401 | 8.8217 | 8.8157 | 8.819 | 0.017643 | 0.017631 | 0.017637 | 43.9 |
| 0.0500 | 9.3592 | 10.106 | 9.733 | 0.018718 | 0.020212 | 0.019465 | 38.9 |
| 0.0603 | 13.223 | 12.639 | 12.93 | 0.026446 | 0.025278 | 0.025862 | 42.9 |
| 0.0803 | 16.913 | 17.270 | 17.09 | 0.033826 | 0.034540 | 0.034183 | 42.6 |
| 0.1000 | 22.135 | 22.647 | 22.391 | 0.044270 | 0.045294 | 0.044782 | 44.8 |

Omitting the 0.01% and 0.05% points, the average % recovery is 43.7%.

The results from these measurements are compared with the FTIR and UV data in the table below.

TABLE 6

| | | Guar Content (wt %) | | |
|---|---|---|---|---|
| Sample | Wash | GPC-RI | FTIR | UV |
| R0931-042-15 | 1st | 0.23 | 0.40 | 3.4 |
|  | 2nd | 0.10 | 0.15 | 0.8 |
| R0931-042-16 | 1st | 0.16 | 0.39 | 3.1 |
|  | 2nd | 0.17 | 0.16 | 1.0 |
| R0931-042-17 | 1st | 0.25 | 0.56 | 3.6 |
|  | 2nd | 0.12 | 0.14 | 0.8 |
| R0931-042-18 | 1st | 0.30 | 0.52 | 3.6 |
|  | 2nd | 0.10 | 0.14 | 0.7 |

The derivatized polysaccharides according to the present invention can be utilized in any number of suitable applications including personal care, household, and pet care applications, such as, for example, shampoos, body washes, hand soaps, lotions, creams, conditioners, shaving products, facial washes, neutralizing shampoos, personal wipes, and skin treatments. The derivatized polysaccharides of the present invention is also useful in other industrial fields, where the purity characteristics of the product are of particular importance, such as well and oil field applications and the like.

The personal care compositions comprise cationic guar of the invention and one or more "benefit agents" that is, materials known in the art that provide a personal care benefit, such as moisturizing or conditioning, to the user of the personal care composition, such as, for example, cleansing agents such as anionic surfactants, cationic surfactants, amphoteric surfactants, zwitterionic surfactants and non-ionic surfactants, as well as emollients, moisturizers, conditioners, polymers, vitamins, abrasives, UV absorbers, antimicrobial agents, anti-dandruff agents, fragrances, depigmentation agents, reflectants, thickening agents, detangling/wet combing agents, film forming polymers, humectants, amino acid agents, antimicrobial agents, allergy inhibitors, anti-acne agents, anti-aging agents, anti-wrinkling agents, antiseptics, analgesics, antitussives, antipruritics, local anesthetics, anti-hair loss agents, hair growth promoting agents, hair growth inhibitor agents, antihistamines, antiinfectives, inflammation inhibitors, anti-emetics, anticholinergics, vasoconstrictors, vasodilators, wound healing promoters, peptides, polypeptides and proteins, deodorants and anti-perspirants, medicament agents, hair softeners, tanning agents, skin lightening agents, depilating agents, shaving preparations, external analgesics, counterirritants, hemorrhoidals, insecticides, poison ivy products, poison oak products, burn products, anti-diaper rash agents, prickly heat agents, make-up preparations, amino acids and their derivatives, herbal extracts, retinoids, flavoids, sensates, anti-oxidants, hair lighteners, cell turnover enhancers, coloring agents, and mixtures thereof.

It is understood that suitable polysaccharides that can be used in connection with the present invention are not limited to guar but also include (and are not limited to) starches, celluloses, xanthans, such as xanthan gum, polyfructoses such as levan, tara gum, and derivatives of any of the foregoing. For example, the term "polysaccharide" can be interchanged with the term "guar" and vice-versa.

It is apparent that embodiments other than those expressly described herein come within the spirit and scope of the present claims. Accordingly, the present invention is not defined by the above description, but is to be accorded the full scope of the claims so as to embrace any and all equivalent compositions and methods.

What is claimed is:

1. A method for controlling the loss of guar or guar derivatives during a washing process comprising:
    a) obtaining a wash effluent during at least one wash step;
    b) analyzing characteristics of the wash effluent utilizing Fourier transform infra red (FTIR) and Total Organic Content (TOC) analysis by:
        determining the ratio of (i) the concentration of solubilized guar in the wash effluent to (ii) the concentration of impurities in the wash effluent; and
    c) adjusting, based upon analysis of step (b),:
        (i) one or more washing parameters to the washing process,
        (ii) one or more reaction parameters to the reaction process, or
        (iii) a combination of (i) and (ii).

2. The method of claim 1 wherein the washing parameters are selected from the group consisting of: wash ratio, wash flow rate, wash liquid ionic strength, wash time, wash temperature, wash water pH and any combination of the foregoing.

3. The method of claim 1 wherein the reaction parameters are selected from the group consisting of: temperature, stirring speed, soaking time, reaction time, type of reagent, reagent concentration, contact time, pressure, catalyst reaction time, reagent contact time and any combination of the foregoing.

4. The method of claim 1 wherein the step of obtaining wash effluent is continuous.

5. The method of claim 1 wherein step (b) further comprises utilizing a technique selected from the group consisting of nuclear magnetic resonance, gel permeation chromatography (GPC), infrared, near-infrared, HPLC, Light scattering, UV spectroscopy, raman spectroscopy, viscosimetry and any combination thereof.

6. The method of claim 5 wherein the technique utilized is GPC.

7. The method of claim 1 whereby the method is controlled online or via network server.

8. The method of claim 1 whereby the method is conducted as a lab-based analysis.

\* \* \* \* \*